US007729535B2

(12) United States Patent
Henley

(10) Patent No.: US 7,729,535 B2
(45) Date of Patent: Jun. 1, 2010

(54) COLOR CHARACTERIZATION OF HIGH DYNAMIC RANGE IMAGE CAPTURE DEVICES

(75) Inventor: Sharon A. Henley, Mountain View, CA (US)

(73) Assignee: Canon Kabushiki Kaisha, Tokyo (JP)

(*) Notice: Subject to any disclaimer, the term of this patent is extended or adjusted under 35 U.S.C. 154(b) by 1286 days.

(21) Appl. No.: 11/234,657

(22) Filed: Sep. 23, 2005

(65) Prior Publication Data

US 2007/0070364 A1 Mar. 29, 2007

(51) Int. Cl.
*G06K 9/00* (2006.01)
(52) U.S. Cl. ..................................... 382/167
(58) Field of Classification Search ................. 382/162, 382/167, 254; 348/645, 649, 650; 358/518, 358/519, 520
See application file for complete search history.

(56) References Cited

U.S. PATENT DOCUMENTS

| | | | |
|---|---|---|---|
| 6,442,497 B1 * | 8/2002 | Houston et al. | 702/107 |
| 6,628,826 B1 * | 9/2003 | Gilman et al. | 382/167 |
| 6,836,345 B1 * | 12/2004 | Setchell | 358/1.9 |
| 6,864,916 B1 | 3/2005 | Nayar et al. | 348/224.1 |
| 6,888,552 B2 | 5/2005 | Debevec et al. | 345/589 |
| 7,414,758 B2 * | 8/2008 | Vaughn | 358/474 |

OTHER PUBLICATIONS

Paul E. Debevec, et al.; "Recovering High Dynamic range Radiance Maps From Photographs", SIGGRAPH 97 Conference Proceedings, Computer Graphics Annual Conference Series, 1997, Aug. 3-8, 1997; pp. 369-378, available at http://www.debevec.org/Publications/.

Mark A. Robertson, et al.; "Dynamic Range Improvement Through Multiple Exposures", Image Processing, 1999. ICIP 99. Proceedings. 1999 International Conference vol. 3; 1999; pp. 159-163, available at http://www.seanborman.com/publications/icip99a.pdf.

Mark A. Robertson, et al.; "Estimation-theoretic Approach To Dynamic Range Enhancement Using Multiple Exposures", Journal Of Electronic Imaging 12(2); Apr. 2003; pp. 219-228.

(Continued)

*Primary Examiner*—Jose L Couso
(74) *Attorney, Agent, or Firm*—Fitzpatrick, Cella, Harper & Scinto

(57) ABSTRACT

Color characterization of a high dynamic range (HDR) image capture device is provided. Color checker image data of a color checker at multiple exposures is obtained. Color values for neutral patches and exposure values are extracted. A colorimetrically accurate response curve is determined based on the neutral patch color values and the exposure values. An optimized transformation associated with the device is derived through gamma curve compensation based on the neutral patch data and comparison of color values of the compensated image with known color values of the color checker. A calorimetrically accurate HDR image is generated from scene image data of a scene captured by the device at multiple exposures through extraction of exposure data, modification of color values based on the colorimetrically accurate response curve and the exposure data, averaging the modified color values, and transformation of the averaged color values based on the optimized transformation.

52 Claims, 12 Drawing Sheets

OTHER PUBLICATIONS

Simon Hoffmann, "Building A High Dynamic Range Video Camera", http://graphics.cs.uni-sb.de/Publications/Teaching/practicals/hoffmann2003.pdf; acquired Aug. 15, 2005.

Corey Manders, et al.; "Camera Response Function Recovery From Different Illuminations Of Identical Subject Matter", Image Processing, 2004. ICIP '04. 2004 International Conference, vol. 5; Oct. 24-27, 2004; pp. 2965-2968, available at http://www.eyetap.org/papers/docs/icip2004.pdf.

"Creating A Camera Curve Profile" http://www.ulead.co.uk/learning/pi/pi10_03_1.htm; acquired Sep. 23, 2005.

"HDR Shop Tutorials" http://www.ict.usc.edu/graphics/HDRShop/main-pages/tutorials.html; acquired Sep. 23, 2005.

* cited by examiner

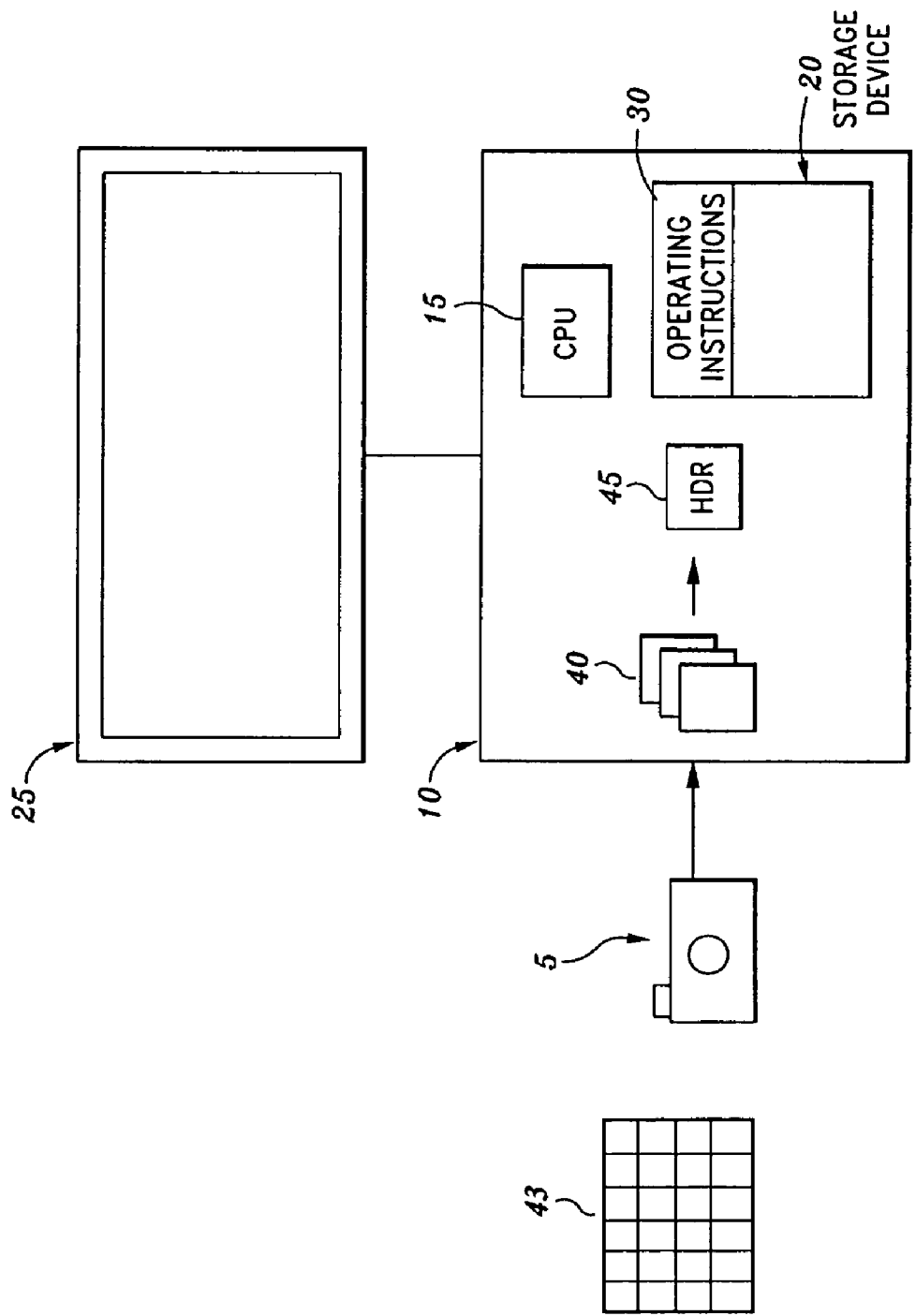

COLOR CHARACTERIZATION OF HIGH DYNAMIC RANGE IMAGE CAPTURE DEVICES

BACKGROUND OF THE INVENTION

1. Field of the Invention

This invention pertains to color characterization of image capture devices that are used to capture high dynamic range ("HDR") images. Specifically, the invention relates to color characterization of an HDR image capture device to generate a calorimetrically accurate device profile for use in producing high dynamic range images having realistic color.

2. Related Background Art

The dynamic range of real world scenes can be high. For a typical outdoor scene on a sunny day, for example, the brightest point in the scene can be 1,000,000 times as bright as the darkest point. Present day methods can create HDR image files of such a scene, typically by merging camera data from multiple exposures of the scene.

While these methods can produce HDR images, present day methods do not provide HDR images that are colorimetrically accurate. In other words, the colors of HDR images produced by present day methods do not look like those in the original scene, resulting in HDR images that are unrealistic.

SUMMARY OF INVENTION

To address the foregoing, the present invention provides color characterization of an HDR image capture device. The color characterization of the HDR image capture device results in a calorimetrically accurate device profile, which is used to generate HDR images having realistic color.

Because the present invention provides for a calorimetrically accurate device profile of an HDR image capture device, the HDR images captured by the profiled device can be reproduced with realistic colors. In other words, once the device is profiled by the colorimetric characterization process of the present invention, the device is a calorimetrically optimized system able to capture HDR images whose color characteristics are known, such that the HDR image can be reproduced with realistic colors. One way in which the invention provides color characterization of an HDR image capture device is by determining the calorimetrically accurate response curve of the HDR image capture device, which models the device's response to variations in exposure. Data is obtained, for example, from a plurality of color checker images of a color checker at multiple exposures over a high dynamic range. The data includes data for neutral patches. Device-dependent color values are extracted for the neutral patches. For example, the device-dependent color values can be extracted for the neutral patches by identifying boundaries of the color checker, separating the color checker images into individual patches, taking the average of each patch, and generating a single color value for each neutral patch based on the corresponding average.

Exposure values are extracted for the extracted data, for example, by extracting exposure data from image tags of the color checker images. The calorimetrically accurate response curve is determined based on the color values for the neutral patches and the exposure values for the extracted data. The calorimetrically accurate response curve can be determined by generating a system of equations based on the color values for the neutral patches and the exposure values for the extracted data, and solving the system by minimizing least square error. In addition, a weighting function can be defined for subsequent optimization.

Because the invention uses neutral values of a color checker in generating a response curve of the HDR image capture device, the invention provides a more accurate estimate of neutrality of the response curve. Accordingly, the resulting response curve is referred to as the colorimetrically accurate response curve. In addition, the omission of all colors away from neutral values results in a reduction of processing time.

In another aspect of the invention, the optimized transformation of the HDR image capture device is derived. The optimized transformation allows HDR images captured by the HDR image capture device to be converted from a device-dependent color space of the device to a calorimetrically accurate space. A color checker image of a color checker is obtained. A white balance normalization can be performed on the color checker image by obtaining white balance data and performing the white balance normalization based on the white balance data. A compensation based on data for neutral patches of the color checker image is performed to compensate for a gamma curve associated with the HDR image capture device. In one example of compensating for the gamma curve, data for neutral patches of the color checker image is extracted, the neutral patch data is curve fitted to obtain a gamma curve estimate, and the gamma curve estimate is applied to the color checker image. In applying the gamma curve estimate, for example, the gamma curve estimate is evaluated for a color value of a color patch of the color checker image, and the color value of the color patch is renormalized based on the evaluation.

Color values of the compensated color checker image are compared with known color values of the color checker. For example, the color values of the compensated color checker are converted into calorimetrically accurate space based on an initial transformation, color differences are determined between the converted color values and the known color values, and the optimized transformation is determined by adjusting the initial transformation to minimize an average of the color differences. The optimized transformation associated with the HDR image capture device is generated based on the comparison. The optimized transformation is included in a device profile for high dynamic range images.

The optimized transformation can be checked using a second color checker image. For example, color values of the second color checker image of a second color checker are converted into calorimetrically accurate space based on the optimized transformation, and the converted color values of the second color checker image are compared to known color values of the second color checker.

The colorimetrically accurate response curve and the optimized transformation of the HDR image capture device form a device profile of the HDR image capture device. For increased color accuracy, the estimated gamma curve can also be included in the device profile. The device profile can then be used to provide accurate colors in the HDR images captured by the device. Therefore, the invention provides a convenient way to increase color accuracy of HDR images because the color characterization of an HDR image capture device need only be performed once. The resulting device profile can then be used repeatedly to generate HDR images having realistic colors.

For example, once the HDR image capture device is profiled, the device profile is used to generate HDR images in the following manner. Exposure data is extracted from data captured by the profiled HDR capture device. In one example, the captured data is scene image data of a scene captured by the device at multiple exposures over a high dynamic range. Color values of the captured data are modified based on the calorimetrically accurate response curve of the HDR image capture device and the exposure data. The captured data, for example, individual images from an exposure set, are combined into a raw high dynamic range image based on the calorimetrically accurate response curve. If the device profile includes the gamma curve estimation, as discussed above, the color values of the raw high dynamic range image based on a gamma curve estimate. The color values of the raw high dynamic range image are transformed based on the optimized transformation of the HDR image capture device. The optimized transformation is based on the device's color characterization.

The invention may be embodied in a method, apparatus, computer-readable storage medium storing computer-executable process steps, or computer-executable program code stored on a computer-readable medium.

This brief summary has been provided so that the nature of the invention may be understood quickly. A more complete understanding of the invention can be obtained by reference to the following detailed description in connection with the attached drawings.

BRIEF DESCRIPTION OF THE DRAWINGS

FIG. 12 is a block diagram of an exemplary environment in which an embodiment of the present invention can be implemented.

DETAILED DESCRIPTION

Figure 1:
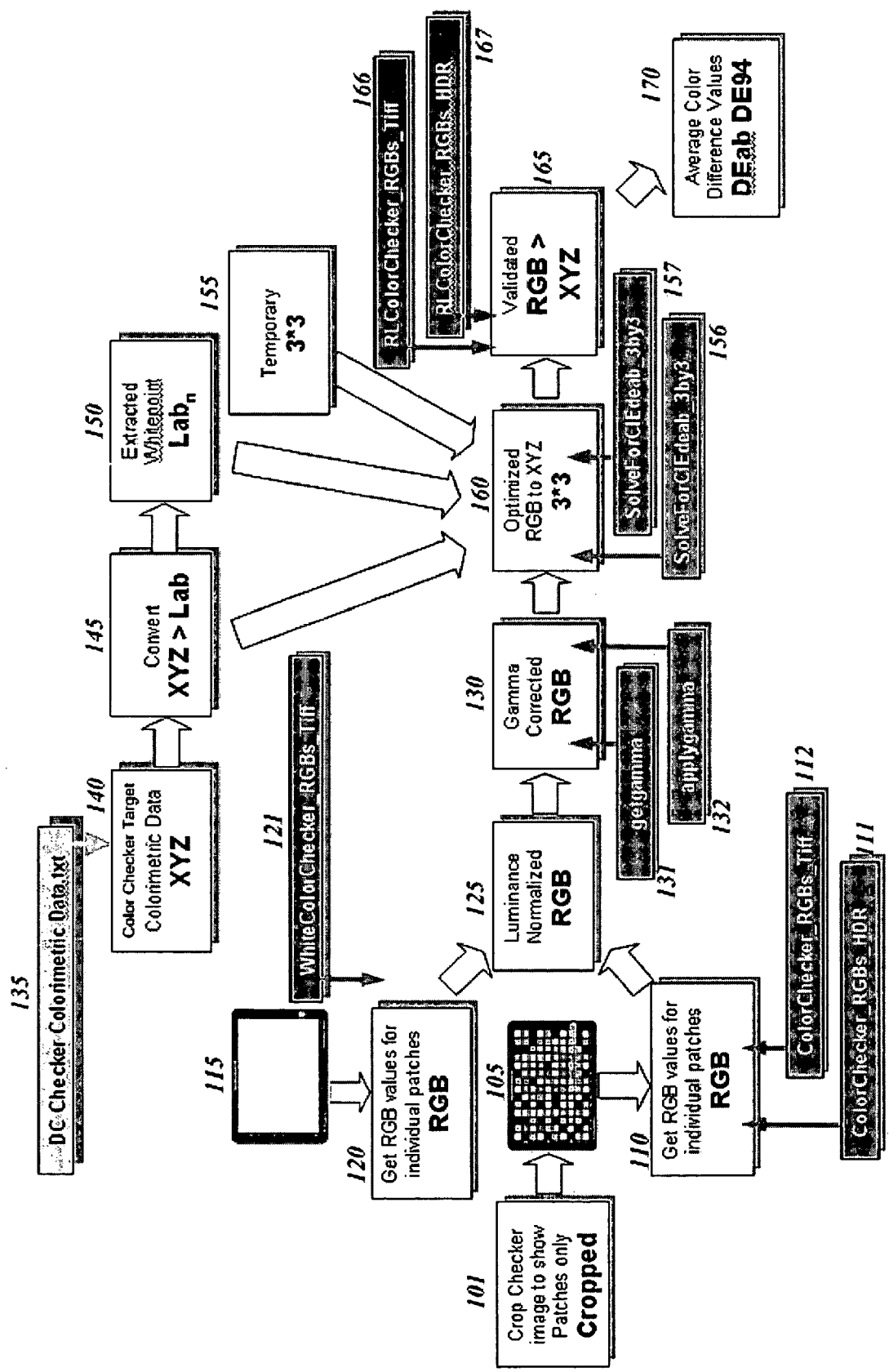
FIG. 1 is a procedural and dataflow diagram of an HDR imaging accuracy workflow according to one embodiment of the present invention.

Embodiments of the present invention are described below with reference to the accompanying drawings. The embodiments describe color characterization of an HDR image capture device, such as a digital camera. The color characterization of the HDR image capture device can be included in a device profile to allow for calorimetrically accurate HDR image reconstruction from multiple exposures of a scene captured by the profiled device. In addition, the device profile can be used to map device-dependent color values, such as RGB values, of the HDR image to calorimetrically accurate color values, such as XYZ values.

The embodiments describe color characterization of an HDR image capture device, for example a digital camera, achieved in a series of connected stages. The color characterization stages described below include identification of the camera response curve, reconstruction of an HDR image of a color checker, and calorimetric characterization of the HDR image.

FIG. 12 depicts one representative embodiment of the present invention. A digital camera 5 is connected to a personal computer 10 having a CPU 15, a storage device 20, and a display 25. Storage device 20 is a computer-readable memory medium (which may be local or non-local such as a networked disk drive medium) that stores computer-executable operating instructions 30 according to an embodiment of the present invention described below.

Digital camera 5 stores digital images 40, which are multiple exposures that bracket the dynamic range of an HDR scene. Numeral 43 is a color checker target such as an ITU standard color patch target. Digital images 40 are transferred to personal computer 10 and combined into a calorimetrically accurate HDR image 45 for processing according to operating instructions 30.

A general overview of the color characterization stages of one embodiment of the present invention is shown in FIG. 1. FIG. 1 depicts a procedural and data flow diagram of one embodiment of an HDR imaging accuracy workflow according to one embodiment of the present invention. Numerals 111, 112, 121, 131, 132, 156, 157, 166 and 167 are program code used to implement the process depicted in FIG. 1.

In FIG. 1, the first stage of the color characterization process is determining the calorimetrically correct camera response curve, which is represented by numerals 101 through 125. In the first stage, color checker images captured by an HDR image capture device (not shown) are input to block 101. At block 101, the images are cropped to show the color patches only, resulting in cropped images. A cropped image 105 is shown for purposes of illustration. At block 110, the boundaries of the cropped images are identified by ColorChecker_RGBs_HDR 111 and the color patches are separated. ColorChecker_RGBs_Tiff 112 then processes the cropped images into a raw HDR image and sends the raw HDR image to block 125. This first stage is discussed in more detail below in connection with FIG. 2.

Data from white balance color checkers 115 is input to block 120. At block 120, WhiteColorChecker_RGBs_Tiff 121 processes white balance color checkers 115 and sends the processed data to block 125. At block 125, the raw HDR image is luminance normalized using the data input from block 120.

The second stage of the color characterization process depicted in FIG. 1 is the calorimetrically accurate characterization of the checker, which is represented by numerals 130 through 160. At block 130, the luminance-normalized raw HDR image is input from block 125 and used by getgamma 131 to determine a gamma curve estimate associated with the image capture device. Applygamma 132 applies the gamma curve estimate to the luminance-normalized raw HDR image and the result is output to block 160. This second stage is discussed in more detail below in connection with FIG. 5.

DC Checker Colorimetric Data.txt 135 is input to block 140. DC Checker Colorimetric Data.txt 135 is a file that contains the pre-measured colorimetric data for a color checker target, such as color checker target 43. The data is pre-measured spectrally using a spectrophotometer. In one example, DC Checker Colorimetric Data.txt 135 contains an XYZ value for each color patch in color checker target 43. The data contained in DC Checker Colorimetric Data.txt 135 may be represented in a chart; the following chart is an illustrative example:

| X | Y | Z |
|---|---|---|
| 73.902 | 78.076 | 84.05 |
| 3.191 | 3.354 | 3.773 |
| 17.481 | 18.596 | 20.525 |
| 74.625 | 78.77 | 84.716 |
| 3.459 | 3.632 | 4.098 |
| 17.609 | 18.715 | 20.655 |
| 74.581 | 78.733 | 84.768 |
| 3.505 | 3.682 | 4.145 |
| 17.49 | 18.596 | 20.528 |
| 73.988 | 78.158 | 84.211 |
| 3.168 | 3.329 | 3.752 |
| 17.33 | 18.434 | 20.344 |
| 17.443 | 18.554 | 20.448 |
| 9.454 | 6.622 | 4.477 |
| 7.001 | 6.552 | 4.815 |
| 18.8 | 19.285 | 14.498 |
| 9.981 | 11.271 | 7.91 |

Figure 9:
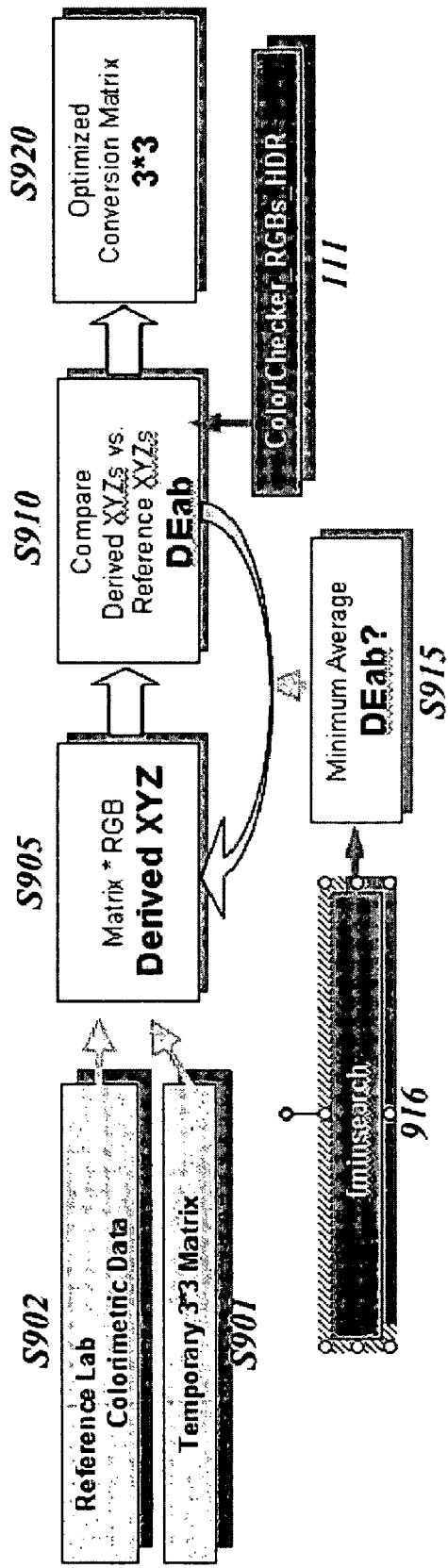
FIG. 9 is a more detailed procedural and dataflow diagram of a workflow for determining minimum average color differences according to one embodiment of the present invention.

There is a corresponding Reference Lab Colorimetric Data.txt file discussed in more detail with respect to FIG. 9.

At block 145, the XYZ data of DC Checker Colorimetric Data.txt 135 is converted into Lab format, and the converted Lab data is output to block 160. At block 150, a whitepoint is extracted from the Lab format data of block 145, and the whitepoint is output to block 160. At block 155, a temporary 3×3 matrix is input, and the temporary matrix is output to block 160.

At block 160, SolveForCIEdeab_3by 3 156 and SolveForCIEdeab_3by3 157 use the data input from blocks 130, 145, 150 and 155 to determine an optimized transformation in a process detailed below, and output the result to block 165.

The third stage of the color characterization process depicted in FIG. 1 is the validation part of the algorithm, which is represented by numerals 165 to 170. The optimized transformation input from block 160 is processed by RLColorChecker_RGBs_Tiff 166 and RLColorChecker_RGBs_HDR 167 to check the accuracy of the optimized transformation. Block 165 outputs average color difference values at block 170. This third stage is discussed in more detail below in connection with FIG. 10.

The process depicted in FIG. 1 is detailed more fully in FIGS. 2 to 11 and accompanying description below.

Figure 2:
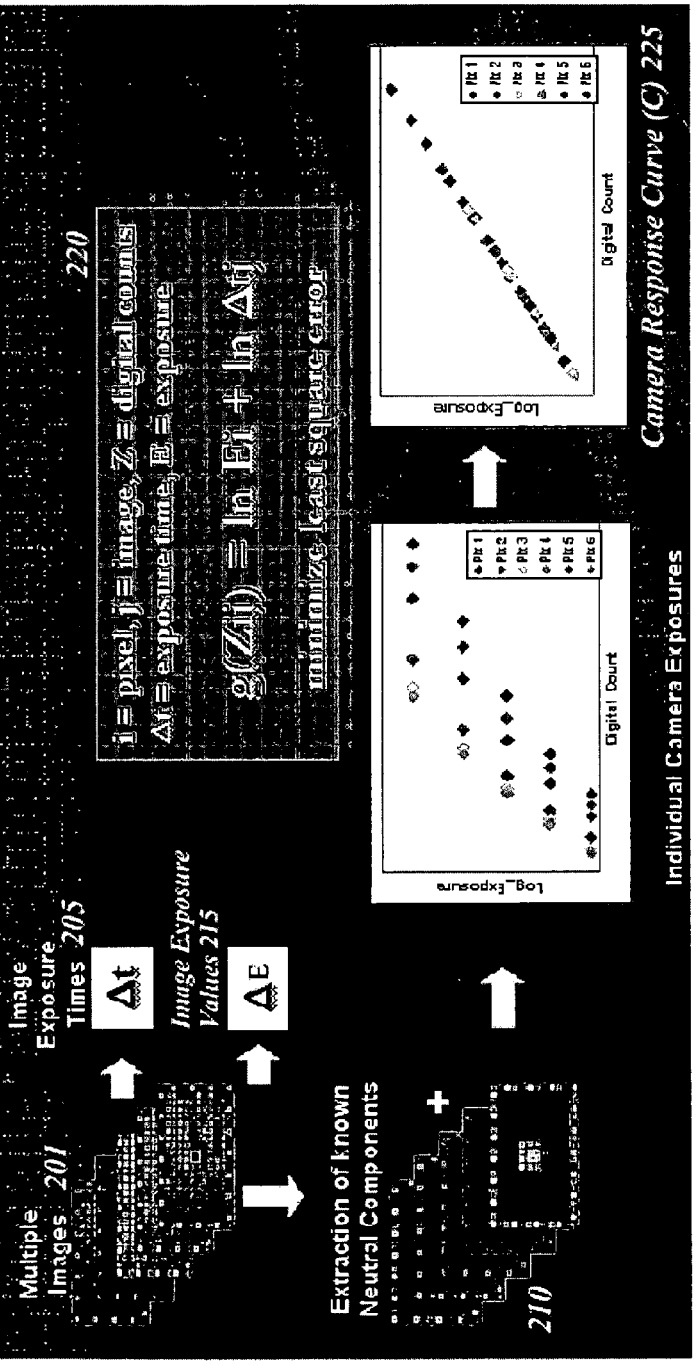
FIG. 2 is a procedural and dataflow diagram of generation of a calorimetrically accurate response curve according to one embodiment of the present invention.

FIG. 2 is a procedural and dataflow diagram of generation of a calorimetrically accurate response curve according to one embodiment of the present invention. The camera response curve models the camera's response to variations in exposure, that is, how a change in exposure time alters the resulting captured pixel value.

Generally, in accordance with FIG. 2, data including data for neutral patches is obtained from a plurality of color checker images of a color checker at multiple exposures over a high dynamic range. Device-dependent color values are extracted for the neutral patches of the color checker images, and exposure values are extracted for the extracted data. For example, exposure values can be extracted from image tags, such as EXIF tags. A calorimetrically accurate response curve is determined based on the color values for the neutral patches and the exposure values for the extracted data. The calorimetrically accurate response curve models the device's response to variations in exposure.

More specifically, FIG. 2 shows data including data for neutral patches obtained through the input of multiple color checker images 201. Image exposure times ($\Delta t_j$) 205 are extracted for each image (1 to j) of color checker images 201. Image exposure values ($E_i$) 210 are extracted from the extracted data for each pixel (1 to i) of color checker images 201. Image exposure times 205 and image exposure values 210 can be extracted from data contained in image tags, such as EXIF tags, of color checker images 201.

Device-dependent color values for the neutral patches, shown as RGB values of the white known neutral components 215, are extracted from color checker images 201. The RGB values of neutral components 215 are represented in the form of digital counts Z(i,j) for each pixel (i) of each image (j) of neutral components 215. This process is shown in more detail in FIG. 3.

Figure 3:
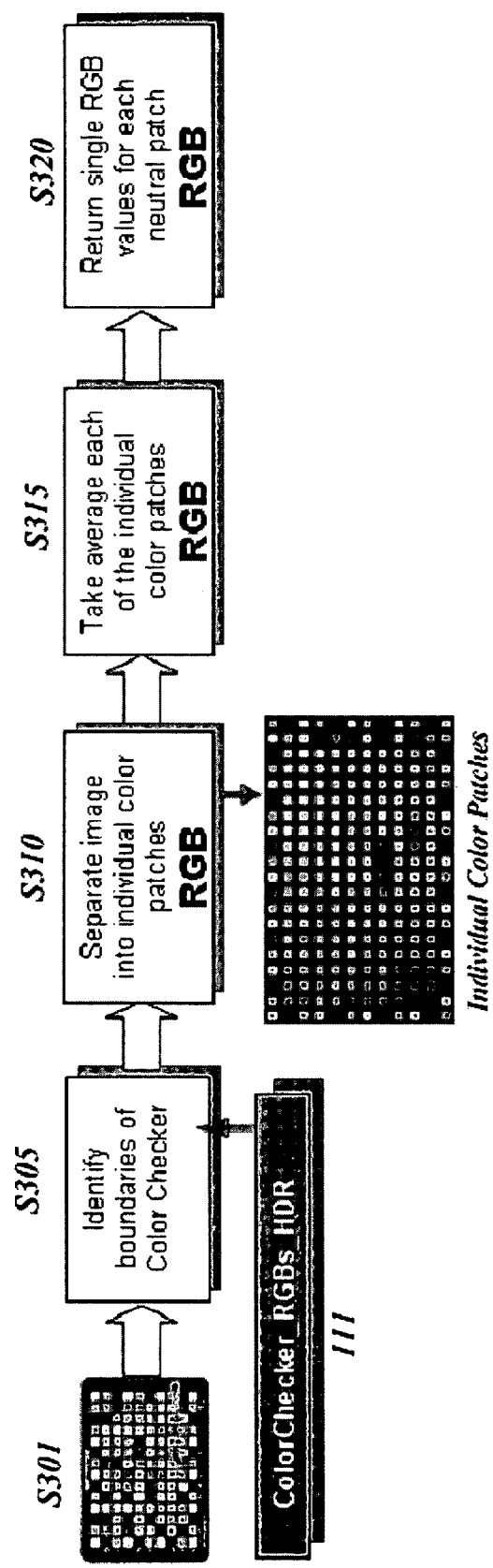
FIG. 3 is process flowchart showing extraction of RGB values of white known neutral components of color checker images according to one embodiment of the present invention.

FIG. 3 is a process flowchart detailing extraction of RGB values of white known neutral components 215 of color checker images 201. An individual color checker image of the plurality of color checker images 201 is input (S301), and the boundaries of the color checker are identified (S305) using ColorChecker_RGBs_HDR 111. The individual color checker image is separated (S310) into individual color patches (shown in FIG. 3 for illustrative purposes). Each individual color patch is averaged (S315), and the resulting single RGB value for each neutral patch is returned (S320). The extraction is repeated for each image of color checker images 201 to generate $Z_{i,j}$.

Reverting to FIG. 2, a calorimetrically accurate response curve is determined from neutral components 215 in the following manner. Neutral components 215 of each image of color checker images form a portion of a camera response curve over a corresponding logarithmic range of exposure. FIG. 2 shows Individual Camera Exposures graph, which illustrates individual response curve portions corresponding to six pixels (Pix 1 to Pix 6) of different neutral patches of neutral components 215. The graph represents a system of equations that will be solved to determine the camera response curve. Because the camera response curve is generated based on neutral value data, neutral components 215 in this embodiment, the colorimetric accuracy of the resulting camera response curve is increased.

The camera response curve (C) is defined as:

$$g(Z_{i,j}) = 1nE_i + 1n\Delta t_j \tag{1}$$

where g is a function of $Z_{i,j}$. Note: $g(Z_{i,j})$=camera response curve (C)

A weighting function is defined for subsequent optimization. The weighting function allows for certain pixel values within an image to be ignored if it is felt that they do not contribute to the validity of the image. For example, in an over exposed image the values greater than 254 will be ignored as these will be assumed to be simply blown out pixels. Additionally, in an under exposed image pixel values less than 3, for example, will be ignored as they will be deemed noise values. For example, the weighting function allows pixels values of 253-255 and 0-2, the high and low end of the range in a 0-255 system, to be ignored.

The system of equations of individual response curve portions is solved (220) to minimize the least square error of equation (1), to obtain a colorimetrically accurate camera response curve (C) 225, which is illustrated in FIG. 2 as Camera Response Curve (C) graph.

Figure 4:
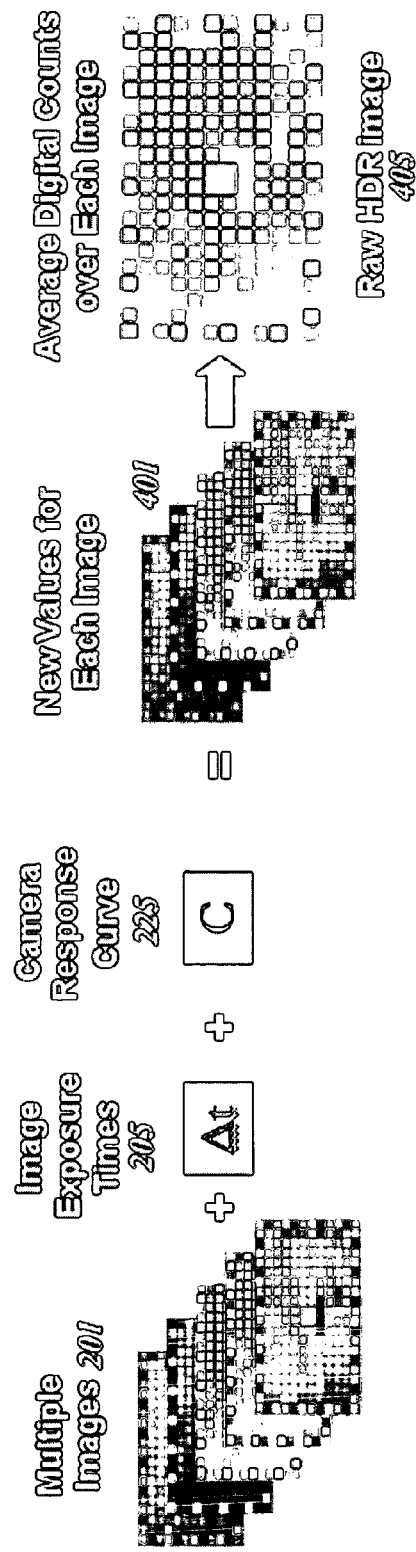
FIG. 4 is a procedural and dataflow diagram of an HDR image reconstruction workflow according to one embodiment of the present invention.

Once camera response curve (C) 225 is obtained, an HDR image of the color checker is reconstructed. FIG. 4 is a procedural and dataflow diagram of an HDR image reconstruction workflow using the calorimetrically accurate camera response curve. First, color checker images 201, image exposure times 205, and camera response curve (C) 225 are input. New RGB values are generated for each image of color checker images 201 using camera response curve (C) 225 and image exposure times 205 according to the following equation:

$$lnE_i = g(Z_{i,j}) - ln\Delta t_j \qquad (2)$$

to generate modified RGB images 401, which are combined into a raw HDR color checker image 405 using camera response curve (C) 225. In other words, the newly generated camera response curve is applied to each of the original RGB images to produce correct images. These images are then averaged to produce the raw HDR image.

Figure 5:
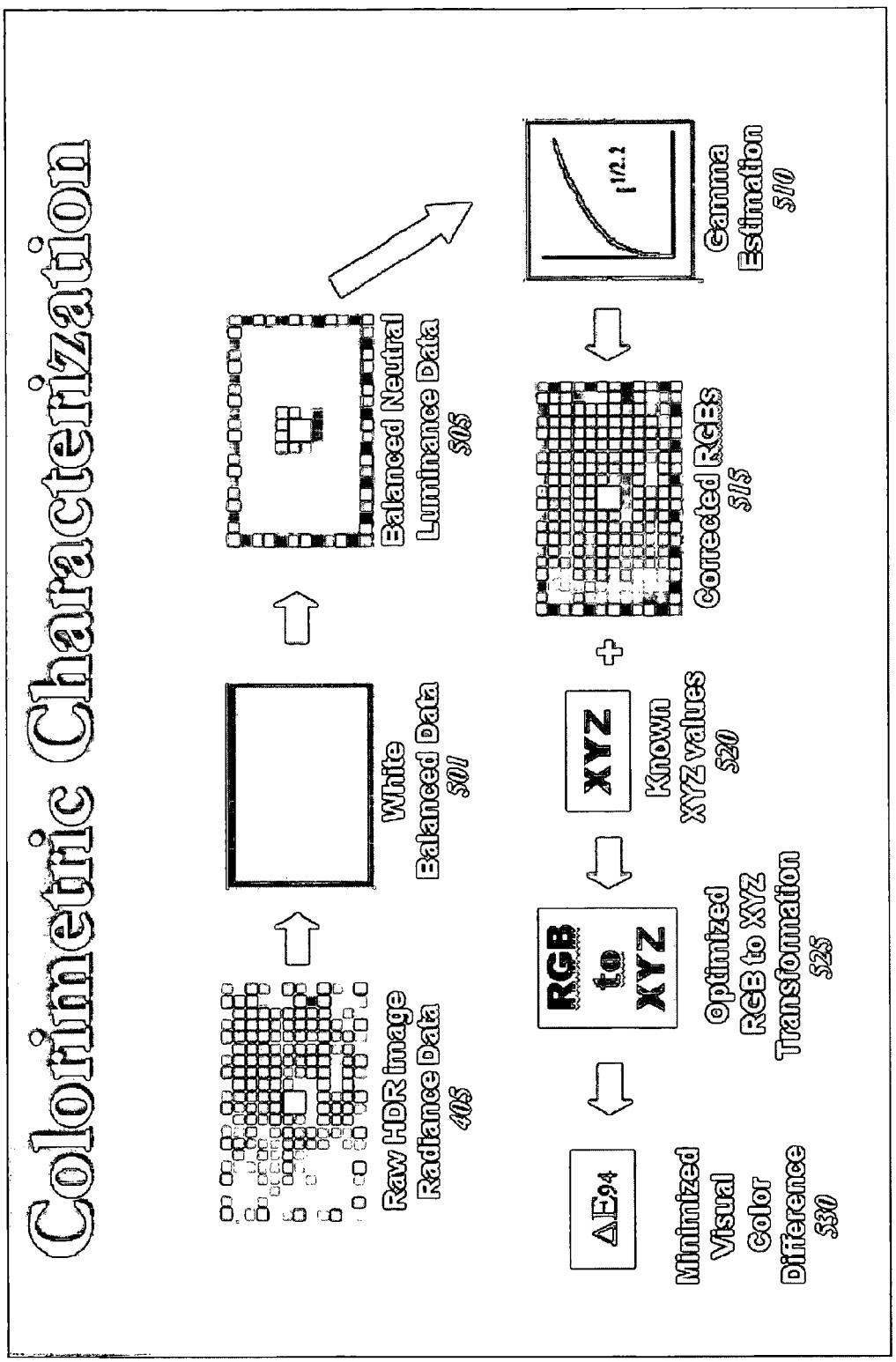
FIG. 5 is a procedural and dataflow diagram of generation of an optimized transformation according to one embodiment of the present invention.

Once raw HDR color checker image 405 is obtained, the camera is calorimetrically characterized by defining a relationship between RGB values captured by the camera and the associated real world colorimetric values in XYZ color space. This RGB to XYZ relationship is the camera's optimized transformation, which allows transformation of the camera's reconstructed HDR images from the device-dependent color space of the camera (RGB) to a colorimetrically accurate color space (XYZ). FIG. 5 is a procedural and dataflow diagram of generation of the optimized transformation.

Briefly, according to the procedure and dataflow of FIG. 5, a color checker target image of a color checker is obtained, and a gamma curve associated with the high dynamic range image capture device is compensated for. The compensation is based on data for neutral patches of the color checker image. Color values of the compensated color checker image are compared with known color values of the color checker, and the optimized transformation associated with the high dynamic range image capture device is generated based on the comparison. The optimized transformation is included in a device profile for high dynamic range images.

In more detail, FIG. 5 shows obtaining the color checker image of a color checker through input of raw HDR color checker image 405. White balance data 501, which is obtained from image data of a white balance color checker captured by the camera, is also input. An optional white point normalization is performed on raw HDR color checker image 405 using white balance data 501. Thereafter, the gamma curve associated with the high dynamic range image capture device is compensated for by an optional gamma curve estimation process detailed in FIG. 6 and a gamma curve application process detailed in FIGS. 7 and 8. The optional gamma curve estimation process is performed to extract white balance neutral data 505 and generate a gamma curve estimate 510 associated with the camera. The process of determining gamma curve estimate 510 is detailed in FIG. 6.

Figure 6:
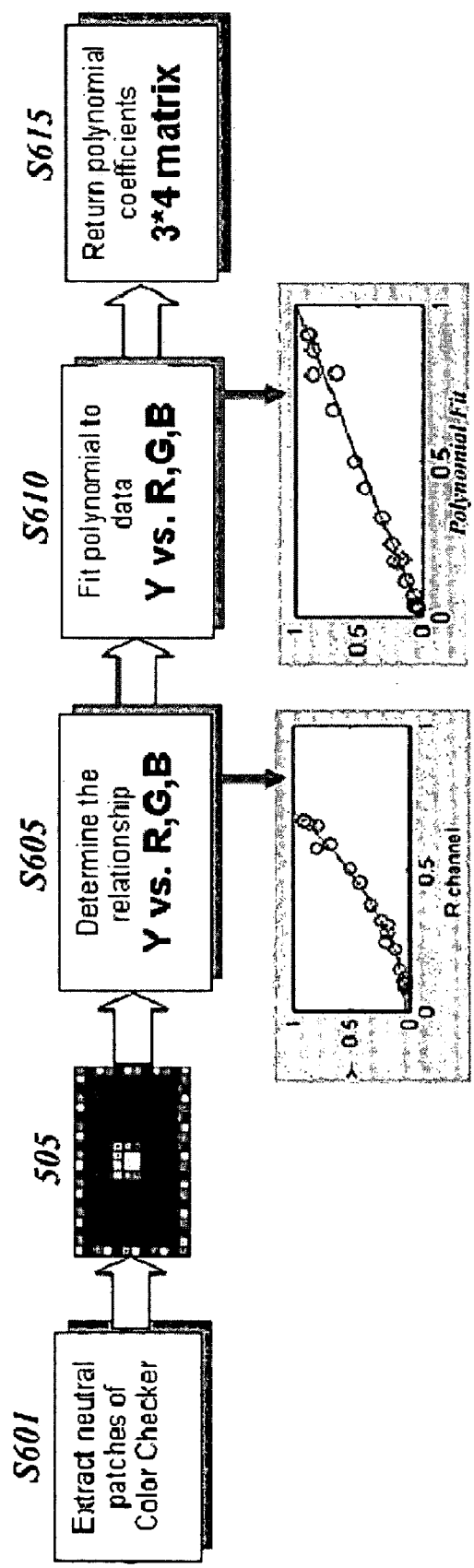
FIG. 6 is process flowchart of gamma curve estimation according to one embodiment of the present invention.

Turning to FIG. 6, white balance neutral data 505 is extracted (S601) from raw HDR color checker image 405 after white point normalization is performed. The relationships between luminance value (Y) and color values (R,G,B) are determined (S605). For example, FIG. 6 shows an R channel graph of an illustrative relationship between Y and R channel data. A polynomial fit is performed (S610) on the data to obtain gamma curve estimate 510, and the polynomial coefficients are output (S615) as a 3×4 matrix. FIG. 6 also shows a Polynomial Fit graph as an example polynomial fit.

Because gamma curve estimate 510 is generated based on a neutral data subset of the color checker, the colorimetric accuracy of gamma curve estimate 510 is increased.

Reverting to FIG. 5, gamma curve estimate 510 is applied to obtain a gamma-corrected HDR color checker image 515. This process is detailed in FIGS. 7 and 8.

Figure 7:
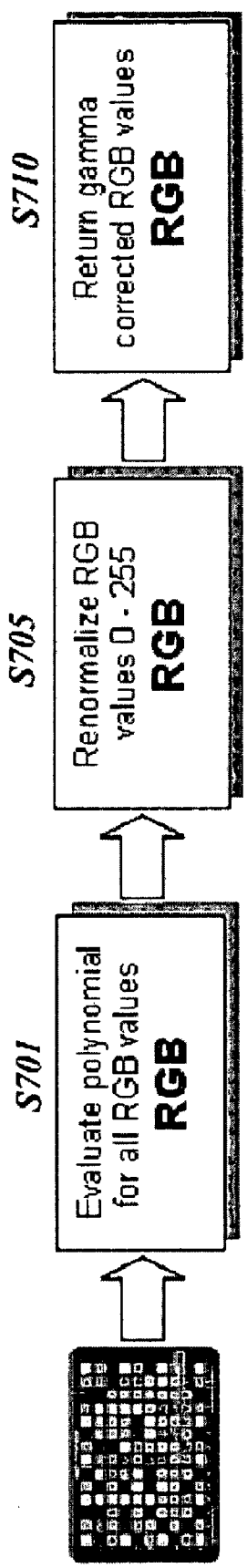
FIG. 7 is a procedural and dataflow diagram of gamma curve estimate application according to one embodiment of the present invention.

Turning to FIG. 7, gamma curve estimate 510 is applied to raw HDR color checker image 405 by evaluating (S701) the corresponding polynomial fit for all RGB values of image 405. The RGB values are then renormalized (S705) to values between 0 and 255.

Figure 8:
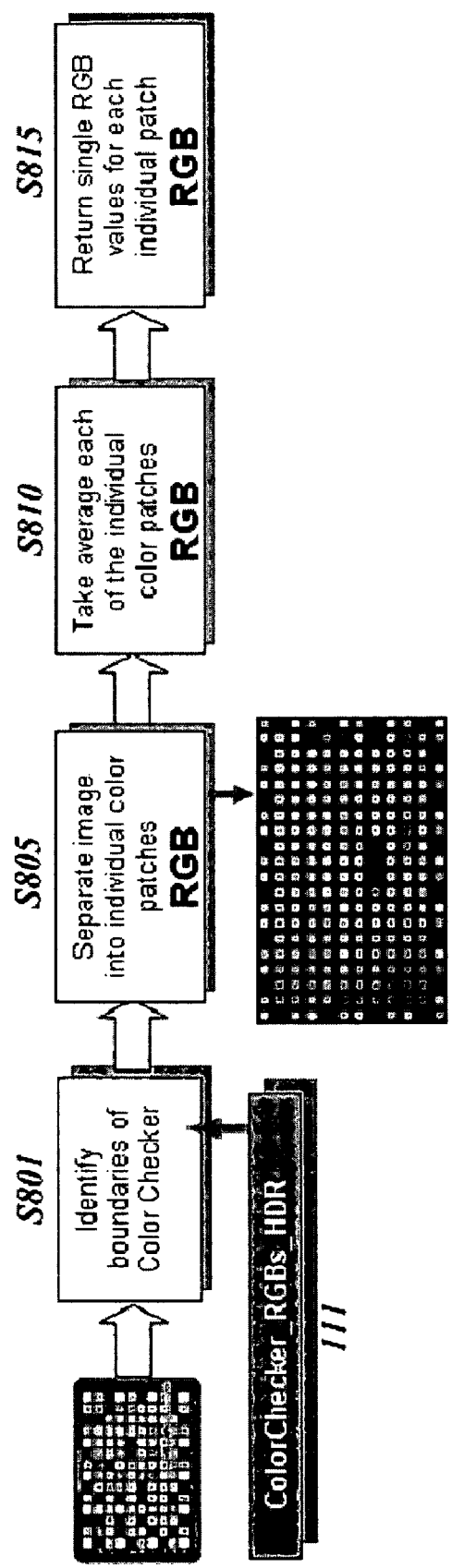
FIG. 8 is a procedural and dataflow diagram of RGB value extraction according to one embodiment of the present invention.

Turning to FIG. 8, the boundaries of the renormalized image are identified (S801) using ColorChecker_RGBs_HDR 111, and the image is separated (S805) into individual color patches. FIG. 8 shows an illustrative example of the separated color patches. The individual color patches are averaged (S810), and single RGB values for each individual patch are output (S815) to form gamma-corrected HDR color checker image 515.

Reverting to FIG. 5, known colorimetrically accurate values of the color checker are input as known XYZ values 520. Color values of the compensated color checker image are then compared with these known color values of the color checker, and the optimized transformation associated with the high dynamic range image capture device is generated based on the comparison. This process is illustrated in FIG. 9, which details how known XYZ values 520 are used to generate optimized RGB to XYZ transformation 525. Numerals 916 is program code used to implement the process depicted in FIG. 9.

Turning to FIG. 9, a temporary 3×3 matrix is input (S901) as an initial guess for the optimized transformation. Reference Lab Colorimetric data is input (S902). Reference Lab Colorimetric data is a text file that contains the Lab equivalent values of this XYZ data for the color checker target. The structure of the text file is similar to DC Checker Colorimetric Data.txt 135.

The RGB values of gamma-corrected HDR color checker image 515 are converted (S905) to XYZ values by multiplying by the temporary 3×3 matrix. Although a temporary 3×3 matrix is used for the conversion of RGB to XYZ in the present embodiment, those skilled in the art will recognize that other methods could also be used. The resulting derived XYZ values are compared (S910) to known XYZ values 520 using a color difference equation, such as CIE DE94 Color Difference Equation, and the comparison is iteratively solved (S915) for the minimum average color difference across all color patches using fminsearch 916. The resulting 3×3 matrix is processed by ColorChecker_RGBs_HDR 111 and the resulting 3×3 optimized conversion matrix is output (S920) as optimized RGB to XYZ transformation 525. A minimized visual color difference 530 is also output.

For increased accuracy, the 3×3 matrix output at S920 can be used as a starting point to generate a 3×9 matrix, and the process of FIG. 9 can be repeated using the 3×9 matrix. For example, the 3×9 matrix can be input to the process of FIG. 9 and used to convert the RGB values of gamma-corrected HDR color checker image 515 to XYZ values. The resulting derived XYZ values are compared to known XYZ values 520 using a color difference equation, and the comparison is iteratively solved for the minimum average color difference across all color patches. The resulting 3×9 optimized conversion matrix is output as optimized RGB to XYZ transformation 525.

Figure 10:
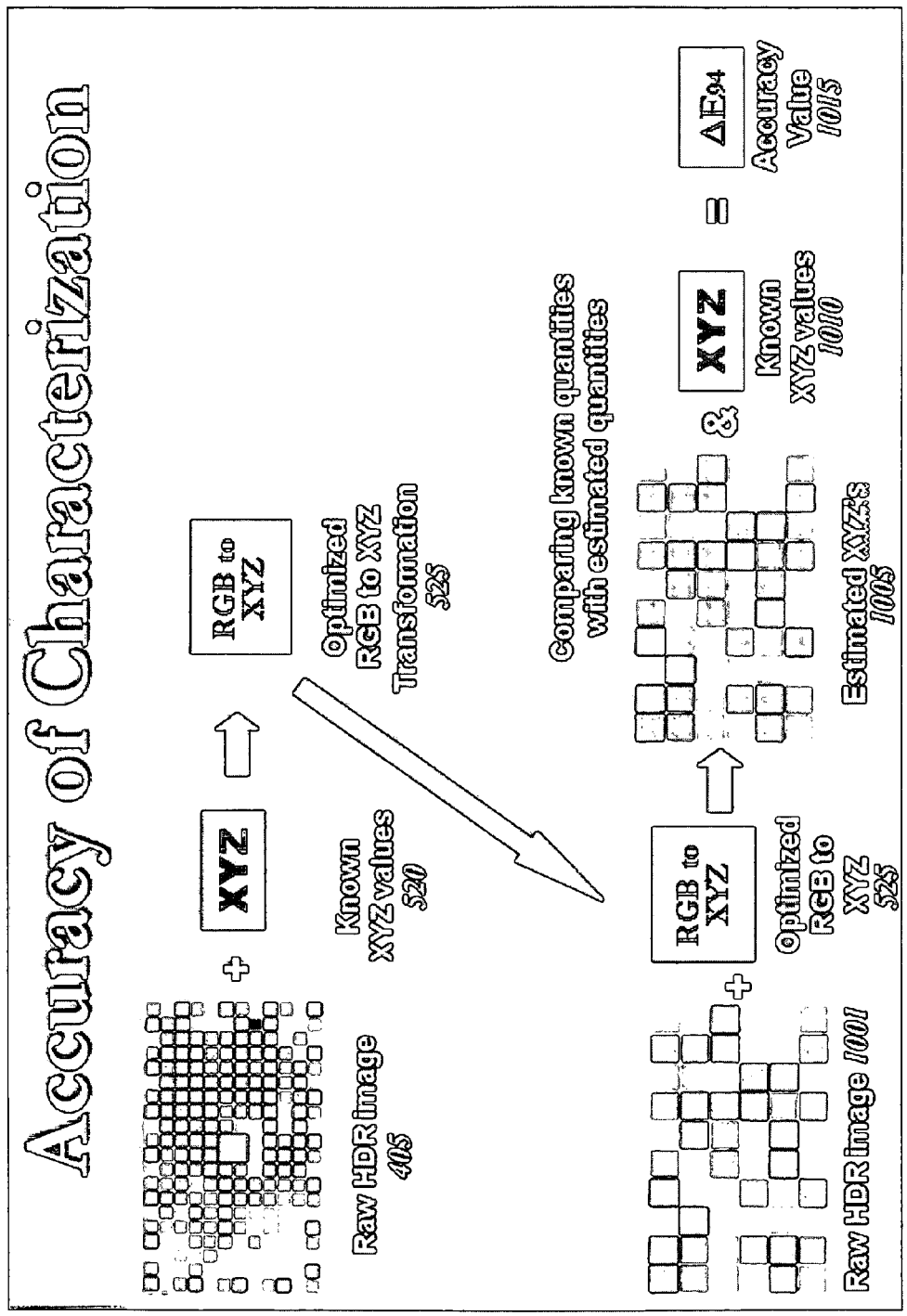
FIG. 10 is a procedural and dataflow diagram of checking results using a second alternative HDR color checker image according to one embodiment of the present invention.

To ensure that overfitting to the color checker values does not occur, the accuracy of the process can be checked by using a second alternative HDR color checker image with associated known colorimetric XYZ data. FIG. 10 is a procedural and dataflow diagram of checking results using a second alternative HDR color checker image.

Turning to FIG. 10, optimized RGB to XYZ transformation 525 is applied to a raw HDR image 1001 of a second alternative HDR color checker image to generate estimated XYZ values 1005. Estimated XYZ values 1005 are compared with known XYZ values 1010 of the second alternative HDR color checker image, and an accuracy value 1015 is obtained. Accuracy value 1015 provides a verification of the accuracy of optimized RGB to XYZ transformation 525.

A device profile of the camera is generated as a result of the calorimetric characterization process described above. Specifically, the camera's device profile includes camera response curve (C) 225, optimized RGB to XYZ transformation 525, and optionally, gamma curve estimate 510. The camera's device profile can then be used to generate calorimetrically accurate HDR images from images captured by the camera, as explained below in connection with FIG. 11.

Briefly, according to the procedure and dataflow of FIG. 1, a calorimetrically accurate HDR image is obtained from data captured by the HDR image capture device. Exposure data is extracted from the captured data. Color values of the captured data are modified based on the calorimetrically accurate response curve of the device and the exposure data. The colorimetrically accurate response curve models the device's response to variations in exposure. The captured data is combined into a raw high dynamic range image based on the calorimetrically accurate response curve, and color values of the raw high dynamic range image are transformed based on the optimized transformation of the device. The optimized transformation is based on the device's color characterization.

Figure 11:
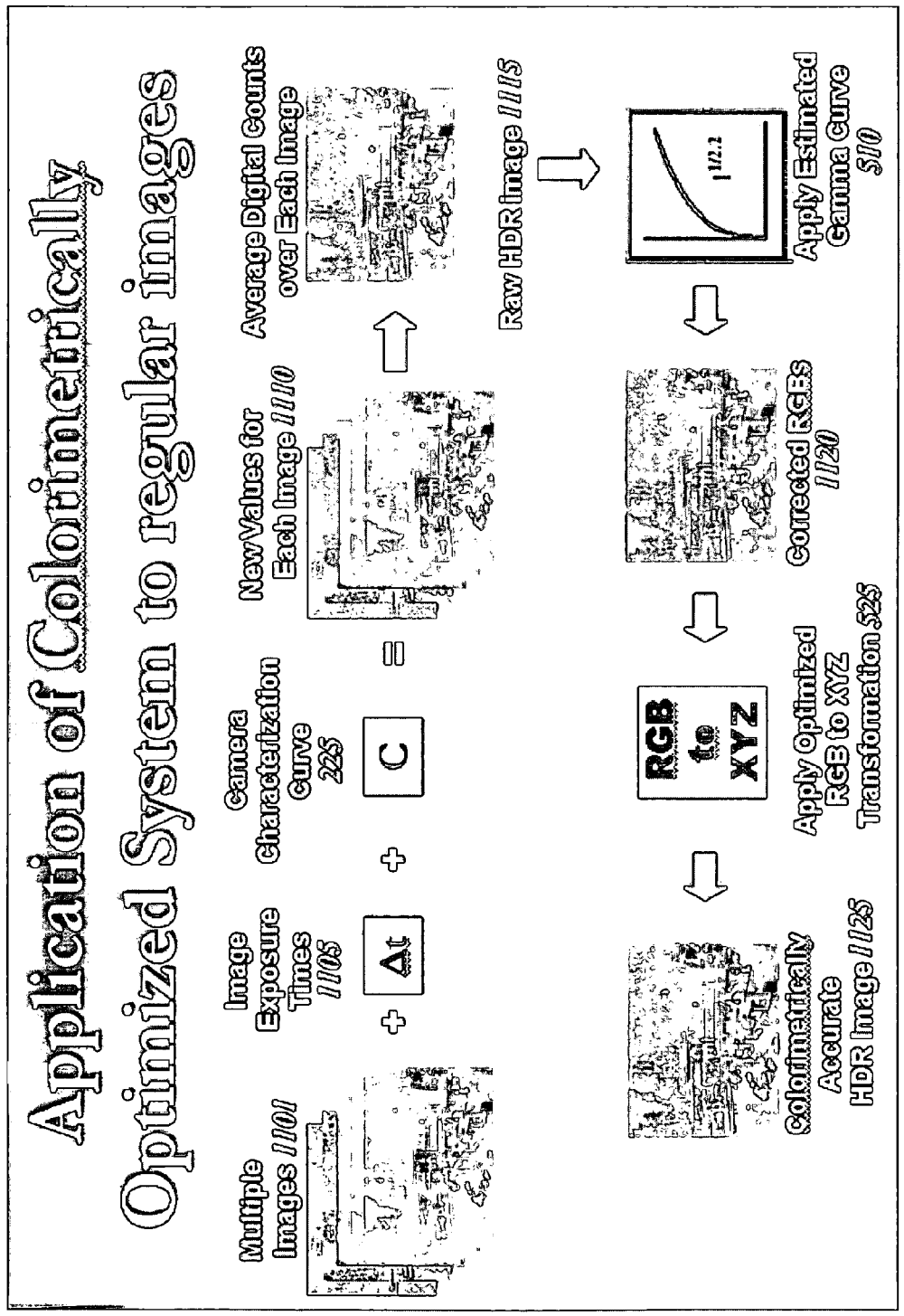
FIG. 11 is a procedural and dataflow diagram of HDR image generation according to one embodiment of the present invention.

In more detail, FIG. 11 shows obtaining data captured by the HDR image capture device through input of multiple images 1101 of a scene captured by the camera at multiple exposures over a high dynamic range. Exposure data, such as image exposure times 1105, is extracted. For example, the exposure data is extracted from the EXIF tags of multiple images 1101. Camera response curve (C) 225 and image exposure times 1105 are used to modify the color values of multiple images 1101 to obtain new color values 1110. The captured data, in the form of new color values 1110, is combined to form raw HDR image 1115 based on camera response curve (C) 225. Gamma curve estimate 510 is applied to raw HDR image 1115 to obtain corrected RGBs 1120. Color values of the raw high dynamic range image are transformed based the optimized transformation by applying optimized RGB to XYZ transformation 525 to raw HDR image 1115 to obtain calorimetrically accurate HDR image 1125.

Although this invention has been described with the aid of certain specific embodiments, many additional modifications and variations would be apparent to those skilled in the art. It is therefore to be understood that this invention may be practiced otherwise than as specifically described. Thus, the above-described embodiments of the invention should be considered in all respects as illustrative and not restrictive, the scope of the invention to be determined by the claims and their equivalents.

What is claimed is:

1. A method of color characterization of a high dynamic range image capture device, the method comprising:

using a processor to obtain data including data for neutral patches, wherein the data is obtained from a plurality of color checker images of a color checker at multiple exposures over a high dynamic range;

using a processor to extract device-dependent color values for the neutral patches;

using a processor to extract exposure values for the extracted data; and using a processor to determine a colorimetrically accurate response curve based on the color values for the neutral patches and the exposure values for the extracted data, wherein the colorimetrically accurate response curve models the device's response to variations in exposure.

2. The method of claim 1, wherein extracting device-dependent color values for the neutral patches includes identifying boundaries of the color checker, separating the color checker images into individual patches, taking the average of each patch, and generating a single color value for each neutral patch based on the corresponding average.

3. The method of claim 1, wherein extracting exposure values for the extracted data includes extracting data from image tags of the color checker images.

4. The method of claim 1, wherein determining the calorimetrically accurate response curve includes generating a system of equations based on the color values for the neutral patches and the exposure values for the extracted data, and solving the system by minimizing least square error.

5. The method of claim 4, wherein solving the system includes defining a weighting function for subsequent optimization.

6. A method of deriving an optimized transformation from a device-dependent color space of a high dynamic range image capture device to a colorimetrically accurate space, the method comprising:

using a processor to obtain a color checker image of a color checker;

using a processor to compensate for a gamma curve associated with the high dynamic range image capture device, the compensation based on data for neutral patches of the color checker image;

using a processor to compare color values of the compensated color checker image with known color values of the color checker; and using a processor to generate the optimized transformation associated with the high dynamic range image capture device based on the comparison, wherein the optimized transformation is included in a device profile for high dynamic range images.

7. The method of claim 6, further comprising:

obtaining white balance data; and performing white balance normalization on the color checker image based on the white balance data.

8. The method of claim 6, wherein compensating for the gamma curve includes extracting data for neutral patches of the color checker image, curve fitting the neutral patch data to obtain a gamma curve estimate, and applying the gamma curve estimate to the color checker image.

9. The method of claim 8, wherein applying the gamma curve estimate includes evaluating the gamma curve estimate for a color value of a color patch of the color checker image, and re-normalizing the color value of the color patch based on the evaluation.

10. The method of claim 6, wherein comparing the color values of the compensated color checker image with the known color values of the color checker includes converting the color values of the compensated color checker into colorimetrically accurate space based on an initial transformation, determining color differences between the converted color values and the known color values, and determining the optimized transformation by adjusting the initial transformation to minimize an average of the color differences.

11. The method of claim 6, further comprising:
checking the optimized transformation by converting color values of a second color checker image of a second color checker into colorimetrically accurate space based on the optimized transformation, and comparing the converted color values of the second color checker image to known color values of the second color checker.

12. A method of obtaining a colorimetrically accurate high dynamic range image from data captured by a high dynamic range image capture device, the method comprising:
using a processor to extract exposure data from the captured data;
using a processor to modify color values of the captured data based on a colorimetrically accurate response curve of the high dynamic range image capture device and the exposure data, wherein the colorimetrically accurate response curve models the device's response to variations in exposure;
using a processor to combine the captured data into a raw high dynamic range image based on the colorimetrically accurate response curve; and
using a processor to transform color values of the raw high dynamic range image based on an optimized transformation of the high dynamic range image capture device, wherein the optimized transformation is based on the device's color characterization.

13. The method of claim 12, further comprising:
adjusting color values of the raw high dynamic range image based on a gamma curve estimate of the high dynamic range image capture device.

14. A computer-executable program stored on a computer-readable medium, the program executable to perform color characterization of a high dynamic range image capture device, the program comprising code executable to perform steps of:
obtaining data including data for neutral patches, wherein the data is obtained from a plurality of color checker images of a color checker at multiple exposures over a high dynamic range;
extracting device-dependent color values for the neutral patches;
extracting exposure values for the extracted data; and
determining a colorimetrically accurate response curve based on the color values for the neutral patches and the exposure values for the extracted data, wherein the colorimetrically accurate response curve models the device's response to variations in exposure.

15. The computer-executable program of claim 14, wherein extracting device-dependent color values for the neutral patches includes identifying boundaries of the color checker, separating the color checker images into individual patches, taking the average of each patch, and generating a single color value for each neutral patch based on the corresponding average.

16. The computer-executable program of claim 14, wherein extracting exposure values for the extracted data includes extracting data from image tags of the color checker images.

17. The computer-executable program of claim 14, wherein determining the calorimetrically accurate response curve includes generating a system of equations based on the color values for the neutral patches and the exposure values for the extracted data, and solving the system by minimizing least square error.

18. The computer-executable program of claim 17, wherein solving the system includes defining a weighting function for subsequent optimization.

19. A computer-executable program stored on a computer-readable medium, the program executable to derive an optimized transformation from a device-dependent color space of a high dynamic range image capture device to a calorimetrically accurate space, the program comprising code executable to perform steps of:
obtaining a color checker image of a color checker;
compensating for a gamma curve associated with the high dynamic range image capture device, the compensation based on data for neutral patches of the color checker image;
comparing color values of the compensated color checker image with known color values of the color checker; and
generating the optimized transformation associated with the high dynamic range image capture device based on the comparison, wherein the optimized transformation is included in a device profile for high dynamic range images.

20. The computer-executable program of claim 19, further comprising code executable to perform steps of:
obtaining white balance data; and
performing white balance normalization on the color checker image based on the white balance data.

21. The computer-executable program of claim 19, wherein compensating for the gamma curve includes extracting data for neutral patches of the color checker image, curve fitting the neutral patch data to obtain a gamma curve estimate, and applying the gamma curve estimate to the color checker image.

22. The computer-executable program of claim 21, wherein applying the gamma curve estimate includes evaluating the gamma curve estimate for a color value of a color patch of the color checker image, and re-normalizing the color value of the color patch based on the evaluation.

23. The computer-executable program of claim 19, wherein comparing the color values of the compensated color checker image with the known color values of the color checker includes converting the color values of the compensated color checker into calorimetrically accurate space based on an initial transformation, determining color differences between the converted color values and the known color values, and determining the optimized transformation by adjusting the initial transformation to minimize an average of the color differences.

24. The computer-executable program of claim 19, further comprising code executable to perform the step of:
checking the optimized transformation by converting color values of a second color checker image of a second color checker into colorimetrically accurate space based on the optimized transformation, and comparing the converted color values of the second color checker image to known color values of the second color checker.

25. A computer-executable program stored on a computer-readable medium, the program executable to obtain a colorimetrically accurate high dynamic range image from data captured by a high dynamic range image capture device, the program comprising code executable to perform steps of:
extracting exposure data from the captured data;
modifying color values of the captured data based on a calorimetrically accurate response curve of the high dynamic range image capture device and the exposure data, wherein the calorimetrically accurate response curve models the device's response to variations in exposure;
combining the captured data into a raw high dynamic range image based on the colorimetrically accurate response curve; and transforming color values of the raw high dynamic range image based on an optimized transformation of the high dynamic range image capture device, wherein the optimized transformation is based on the device's color characterization.

26. The computer-executable program of claim 25, further comprising code executable to perform the step of:

adjusting color values of the raw high dynamic range image based on a gamma curve estimate of the high dynamic range image capture device.

27. A computer-readable medium that stores computer-executable process steps, the computer-executable process steps for color characterization of a high dynamic range image capture device, the computer-executable process steps executable to perform steps of:

obtaining data including data for neutral patches, wherein the data is obtained from a plurality of color checker images of a color checker at multiple exposures over a high dynamic range;

extracting device-dependent color values for the neutral patches;

extracting exposure values for the extracted data; and determining a colorimetrically accurate response curve based on the color values for the neutral patches and the exposure values for the extracted data, wherein the calorimetrically accurate response curve models the device's response to variations in exposure.

28. The computer-readable medium of claim 27, wherein extracting device-dependent color values for the neutral patches includes identifying boundaries of the color checker, separating the color checker images into individual patches, taking the average of each patch, and generating a single color value for each neutral patch based on the corresponding average.

29. The computer-readable medium of claim 27, wherein extracting exposure values for the extracted data includes extracting data from image tags of the color checker images.

30. The computer-readable medium of claim 27, wherein determining the calorimetrically accurate response curve includes generating a system of equations based on the color values for the neutral patches and the exposure values for the extracted data, and solving the system by minimizing least square error.

31. The computer-readable medium of claim 30, wherein solving the system includes defining a weighting function for subsequent optimization.

32. A computer-readable medium that stores computer-executable process steps, the computer-executable process steps for deriving an optimized transformation from a device-dependent color space of a high dynamic range image capture device to a calorimetrically accurate space, the computer-executable process steps comprising code executable to perform steps of:

obtaining a color checker image of a color checker;

compensating for a gamma curve associated with the high dynamic range image capture device, the compensation based on data for neutral patches of the color checker image;

comparing color values of the compensated color checker image with known color values of the color checker; and generating the optimized transformation associated with the high dynamic range image capture device based on the comparison, wherein the optimized transformation is included in a device profile for high dynamic range images.

33. The computer-readable medium of claim 32, wherein the computer-executable process steps further comprise code executable to perform steps of:

obtaining white balance data; and performing white balance normalization on the color checker image based on the white balance data.

34. The computer-readable medium of claim 32, wherein compensating for the gamma curve includes extracting data for neutral patches of the color checker image, curve fitting the neutral patch data to obtain a gamma curve estimate, and applying the gamma curve estimate to the color checker image.

35. The computer-readable medium of claim 34, wherein applying the gamma curve estimate includes evaluating the gamma curve estimate for a color value of a color patch of the color checker image, and re-normalizing the color value of the color patch based on the evaluation.

36. The computer-readable medium of claim 32, wherein comparing the color values of the compensated color checker image with the known color values of the color checker includes converting the color values of the compensated color checker into calorimetrically accurate space based on an initial transformation, determining color differences between the converted color values and the known color values, and determining the optimized transformation by adjusting the initial transformation to minimize an average of the color differences.

37. The computer-readable medium of claim 32, wherein the computer-executable process steps further comprise code executable to perform the step of:

checking the optimized transformation by converting color values of a second color checker image of a second color checker into calorimetrically accurate space based on the optimized transformation, and comparing the converted color values of the second color checker image to known color values of the second color checker.

38. A computer-readable medium that stores computer-executable process steps, the computer-executable process steps for obtaining a calorimetrically accurate high dynamic range image from data captured by a high dynamic range image capture device, the computer-executable process steps comprising code executable to perform steps of:

extracting exposure data from the captured data;

modifying color values of the captured data based on a calorimetrically accurate response curve of the high dynamic range image capture device and the exposure data, wherein the calorimetrically accurate response curve models the device's response to variations in exposure;

combining the captured data into a raw high dynamic range image based on the calorimetrically accurate response curve; and transforming color values of the raw high dynamic range image based on an optimized transformation of the high dynamic range image capture device, wherein the optimized transformation is based on the device's color characterization.

39. The computer-readable medium of claim 38, wherein the computer-executable process steps further comprise code executable to perform the step of:

adjusting color values of the raw high dynamic range image based on a gamma curve estimate of the high dynamic range image capture device.

40. An apparatus for color characterization of a high dynamic range image capture device, the apparatus comprising:

a computer-readable memory that stores computer-executable process steps comprising code executable to perform steps of obtaining data including data for neutral patches, wherein the data is obtained from a plurality of color checker images of a color checker at multiple exposures over a high dynamic range, extracting device-dependent color values for the neutral patches, extracting exposure values for the extracted data, and determining a calorimetrically accurate response curve based on the color values for the neutral patches and the exposure values for the extracted data, wherein the calorimetrically accurate response curve models the device's response to variations in exposure; and a processor coupled to the memory that executes the process steps stored in the memory.

41. The apparatus of claim 40, wherein extracting device-dependent color values for the neutral patches includes identifying boundaries of the color checker, separating the color checker images into individual patches, taking the average of each patch, and generating a single color value for each neutral patch based on the corresponding average.

42. The apparatus of claim 40, wherein extracting exposure values for the extracted data includes extracting data from image tags of the color checker images.

43. The apparatus of claim 40, wherein determining the calorimetrically accurate response curve includes generating a system of equations based on the color values for the neutral patches and the exposure values for the extracted data, and solving the system by minimizing least square error.

44. The apparatus of claim 43, wherein solving the system includes defining a weighting function for subsequent optimization.

45. An apparatus for deriving an optimized transformation from a device-dependent color space of a high dynamic range image capture device to a calorimetrically accurate space, the apparatus comprising:

a computer-readable memory that stores computer-executable process steps comprising code executable to perform steps of obtaining a color checker image of a color checker, compensating for a gamma curve associated with the high dynamic range image capture device, the compensation based on data for neutral patches of the color checker image, comparing color values of the compensated color checker image with known color values of the color checker, and generating the optimized transformation associated with the high dynamic range image capture device based on the comparison, wherein the optimized transformation is included in a device profile for high dynamic range images; and a processor coupled to the memory that executes the process steps stored in the memory.

46. The apparatus of claim 45, wherein the computer-executable process steps further comprise code executable to perform steps of obtaining white balance data, and performing white balance normalization on the color checker image based on the white balance data.

47. The apparatus of claim 45, wherein compensating for the gamma curve includes extracting data for neutral patches of the color checker image, curve fitting the neutral patch data to obtain a gamma curve estimate, and applying the gamma curve estimate to the color checker image.

48. The apparatus of claim 47, wherein applying the gamma curve estimate includes evaluating the gamma curve estimate for a color value of a color patch of the color checker image, and re-normalizing the color value of the color patch based on the evaluation.

49. The apparatus of claim 45, wherein comparing the color values of the compensated color checker image with the known color values of the color checker includes converting the color values of the compensated color checker into calorimetrically accurate space based on an initial transformation, determining color differences between the converted color values and the known color values, and determining the optimized transformation by adjusting the initial transformation to minimize an average of the color differences.

50. The apparatus of claim 45, wherein the computer-executable process steps further comprise code executable to perform the step of checking the optimized transformation by converting color values of a second color checker image of a second color checker into calorimetrically accurate space based on the optimized transformation, and comparing the converted color values of the second color checker image to known color values of the second color checker.

51. An apparatus for obtaining a calorimetrically accurate high dynamic range image from data captured by a high dynamic range image capture device, the apparatus comprising:

a computer-readable memory that stores computer-executable process steps comprising code executable to perform steps of extracting exposure data from the captured data, modifying color values of the captured data based on a calorimetrically accurate response curve of the high dynamic range image capture device and the exposure data, wherein the calorimetrically accurate response curve models the device's response to variations in exposure, combining the captured data into a raw high dynamic range image based on the colorimetrically accurate response curve, and transforming color values of the raw high dynamic range image based on an optimized transformation of the high dynamic range image capture device, wherein the optimized transformation is based on the device's color characterization; and a processor coupled to the memory that executes the process steps stored in the memory.

52. The apparatus of claim 51, wherein the computer-executable process steps further comprise code executable to perform the step of adjusting color values of the raw high dynamic range image based on a gamma curve estimate of the high dynamic range image capture device.

* * * * *